United States Patent
Yamamoto

(10) Patent No.: US 11,644,447 B2
(45) Date of Patent: May 9, 2023

(54) HYDROGEN FLAME IONIZATION DETECTOR

(71) Applicant: Shimadzu Corporation, Kyoto (JP)

(72) Inventor: Ryosuke Yamamoto, Kyoto (JP)

(73) Assignee: Shimadzu Corporation, Kyoto (JP)

(*) Notice: Subject to any disclaimer, the term of this patent is extended or adjusted under 35 U.S.C. 154(b) by 0 days.

(21) Appl. No.: 17/528,690

(22) Filed: Nov. 17, 2021

(65) Prior Publication Data

US 2023/0078560 A1    Mar. 16, 2023

(30) Foreign Application Priority Data

Sep. 16, 2021    (JP) .............................. JP2021-151172

(51) Int. Cl.
*G01N 27/62*    (2021.01)
*G01N 30/68*    (2006.01)
*G01N 27/626*    (2021.01)

(52) U.S. Cl.
CPC ........... *G01N 30/68* (2013.01); *G01N 27/626* (2013.01)

(58) Field of Classification Search
None
See application file for complete search history.

(56) References Cited

U.S. PATENT DOCUMENTS

| | | | |
|---|---|---|---|
| 5,014,009 A * | 5/1991 | Arimoto | G01N 27/4075 73/23.35 |
| 5,073,753 A * | 12/1991 | Collings | G01N 27/626 436/154 |
| 2013/0333443 A1* | 12/2013 | Miyai | G01M 15/102 73/23.31 |
| 2014/0151550 A1* | 6/2014 | Hiraoka | H01J 49/10 250/288 |
| 2017/0168015 A1* | 6/2017 | Lippert-Gellissen | G01N 27/626 |
| 2022/0250102 A1* | 8/2022 | Fujii | H01J 49/0468 |

FOREIGN PATENT DOCUMENTS

JP    2000-206091 A    7/2000

* cited by examiner

*Primary Examiner* — Thang X Le
(74) *Attorney, Agent, or Firm* — Muir Patent Law, PLLC

(57) ABSTRACT

A hydrogen flame ionization detector includes a nozzle configured to eject a sample gas upward, a cylindrical collector provided above the nozzle with a longitudinal direction thereof vertically oriented, the collector being configured to collect ions generated by a hydrogen flame formed at a tip of the nozzle, an insulator provided to hold the collector therein in such a manner as to extend in a radially inward direction of the collector, and a collector housing configured to accommodate the collector therein in such a manner as to surround an outer peripheral surface of the collector while holding a peripheral portion of the insulator. An accumulation suppression structure is provided above the insulator to suppress a material emitted from an upper end of the collector from being accumulated in such a manner as to shorten an insulation distance between the collector and the collector housing.

5 Claims, 2 Drawing Sheets

HYDROGEN FLAME IONIZATION DETECTOR

CROSS-REFERENCE TO RELATED APPLICATIONS

This application claims priority under 35 U.S.C. § 119 to Japanese Patent Application No. 2021-151172 filed on Sep. 16, 2021, the entire disclosure of which is incorporated herein by reference in its entirety.

TECHNICAL FIELD

The present invention relates to a hydrogen flame ionization detector.

BACKGROUND OF THE INVENTION

As a detector for a gas chromatograph (hereinafter simply referred to as "GC"), a hydrogen flame ionization detector (hereinafter simply referred to as "FID") is known. The FID is configured as follows. A hydrogen gas is mixed with a sample gas flowing out of an outlet of a separation column of a GC and is discharged from a tip of a nozzle. A hydrogen flame is formed at the tip of the nozzle to ionize the components contained in the sample gas. The generated ions are collected by a collector, and the quantity of the ions collected by the collector is detected as an electric current.

The collector for collecting the ions generated by the hydrogen flame is fixed in a metallic collector housing in a state of being arranged above the nozzle. To the collector, an insulator is attached so as to extend radially outward of the collector. The insulator is held by the collector housing, so that the collector is electrically insulated from the collector housing (see Patent Document 1).

PRIOR ART DOCUMENT

Patent Document

Patent Document 1: Japanese Unexamined Patent Application Publication No. 2000-206091

SUMMARY OF THE INVENTION

Problems to be Solved by the Invention

As a degradational phenomenon of an FID, a phenomenon, such as, e.g., an increase of noise in an output signal and an increase of a baseline, can be exemplified. It was found that the degradational phenomenon was caused by a decrease in the insulation between the collector and the collector housing.

Under the circumstance, the present invention aims to extend the life of an FID by suppressing the deterioration of the insulation between a collector and a collector housing.

Means for Solving the Problems

The present inventor has found that one of the reasons for the deterioration of the insulation between the collector and the collector housing is an accumulation of conductive materials on the insulator insulating the collector and the collector housing. For example, when a sample gas containing carbon disulfide ($CS_2$) is introduced into the FID, the sulfide ions ionized by the hydrogen flame react with the stainless-based metallic parts constituting the FID to produce a conductive material. When such a conductive material is accumulated on the insulator that insulates the collector from the collector housing, problems, such as, e.g., shortening of the insulation distance between the collector and the collector housing and electrical continuity between the collector and the collector housing, occur. The present invention has been made based on such findings. The main object of the present invention is to suppress deterioration of insulation between a collector and a collector housing due to the accumulation of a conductive material on an insulator that insulates the collector from the collector housing.

That is, a hydrogen flame ionization detector (hereinafter referred to as "FID") is provided with: a nozzle configured to eject a sample gas upward; a cylindrical collector provided above the nozzle with a longitudinal direction thereof vertically oriented, the collector being configured to collect ions generated by a hydrogen flame formed at a tip of the nozzle; an insulator configured to hold the collector on an inside of the insulator, the insulator being configured to extend in a radially outward direction of the collector; and a collector housing configured to accommodate the collector therein in such a manner as to surround an outer peripheral surface of the collector while holding a peripheral portion of the insulator. An accumulation suppression structure is provided above the insulator to suppress a material emitted from an upper end of the collector from being accumulated in such a manner as to shorten an insulation distance between the collector and the collector housing.

Effects of the Invention

According to the FID of the present invention, an accumulation suppression structure is provided above the insulator to suppress a material emitted from an upper end of the collector from being accumulated in such a manner as to shorten an insulation distance between the collector and the collector housing. Therefore, the deterioration of the insulation between the collector and the collector housing is suppressed, which in turn can extend the life of the FID.

EMBODIMENTS FOR CARRYING OUT THE INVENTION

Hereinafter, an embodiment of an FID according to the present invention will be described with reference to the attached drawings.

Figure 1:
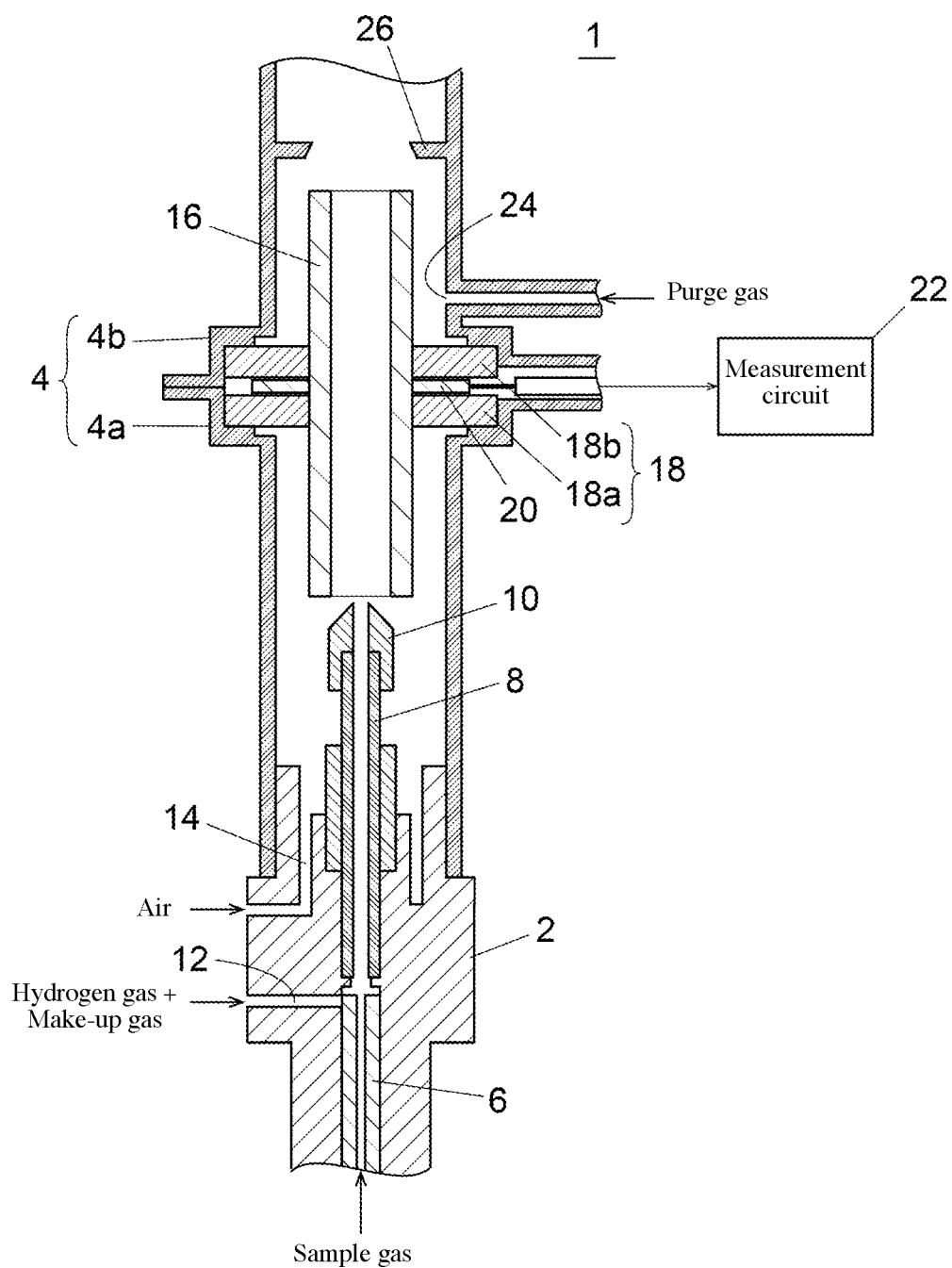
FIG. 1 is a cross-sectional configuration diagram showing an example of an FID.

As shown in FIG. 1, the FID 1 is provided with a housing body 2 and a collector housing 4. The collector housing 4 is attached to the upper portion of the housing body 2.

The introduction pipe 6 is inserted into the housing body 2 from below. Although not illustrated, an outlet of a separation column of a GC is connected to the lower end of the introduction pipe 6, and a sample gas passed through the separation column of the GC is introduced upward through the introduction pipe 6. A nozzle 8 is provided at a position directly above the introduction pipe 6. The nozzle 8 is held by the housing body 2 so as to be fluidly connected to the outlet of the introduction pipe 6. The upper end of the nozzle 8 protrudes upward from the housing body 2 and is positioned in a space surrounded by the collector housing 4. The nozzle 8 is provided with a nozzle cap 10 at the end. Although not illustrated, a constant voltage is applied to the nozzle cap 10.

The housing body 2 is provided with a hydrogen gas introduction flow path 12 and an air introduction flow path 14. The hydrogen gas introduction flow path 12 is a flow path for introducing a mixed gas of a hydrogen gas and a make-up gas and is communicated with the connecting portion between the introduction pipe 6 and the nozzle 8. The mixture gas of the hydrogen gas and the make-up gas introduced from the hydrogen gas introduction flow path 12 is mixed with the sample gas introduced through the introduction pipe 6 and is ejected upward from the tip of the nozzle cap 10. The air introduction flow path 14 is a flow path for introducing a combustion assist gas (air) toward the periphery of the nozzle cap 10. At the top of the nozzle cap 10, the hydrogen gas is ignited by an igniter (not shown) to form a hydrogen flame above the nozzle cap 10. The analyte components in the sample gas ejected from the tip of the nozzle cap 10 are ionized by the hydrogen flame.

A cylindrical collector 16 having a longitudinal direction is provided at a position directly above the nozzle 8 in the collector housing 4. The collector 16 is arranged with the longitudinal direction thereof vertically oriented. The collector 16 is for collecting ions generated by the hydrogen flame generated at the tip of the nozzle cap 10. The collector 16 is provided with a terminal 20 on the outer peripheral surface, and a measurement circuit 22 is electrically connected to the collector 16 via the terminal 20. The measurement circuit 22 is an electronic circuitry for extracting the ion current of the ions collected by the collector 16 to detect the components in the sample gas based on the ion current.

The insulator 18 has a lower insulator 18a and an upper insulator 18b. The lower insulator 18a and the upper insulator 18b each are a disc-shaped insulating member having a through-hole in the central portion for holding the collector 16 therein and are provided in such a manner as to extend radially outward of the collector 16 from the outer peripheral surface of the collector 16. The lower insulator 18a and the upper insulator 18b are each made of, for example, ceramics.

The collector housing 4 is provided with a lower part 4a and an upper part 4b. The lower part 4a and the upper part 4b are fixed to each other in a state of sandwiching the peripheral portions of the lower insulator 18a and the upper insulator 18b therebetween, thereby holding the peripheral portion of the insulator 18. The collector housing 4 is provided with a purge gas inlet 24 at a position below the upper end of the collector 16 and above the upper insulator 18. The purge gas inlet 24 is for introducing a purge gas into the collector housing 4. By introducing the purge gas into the collector housing 4 from the purge gas inlet 24, an updraft is formed above the upper insulator 18, which prevents the material emitted from the upper end of the collector 16 from being accumulated on the upper surface of the upper insulator 18b. That is, the purge gas inlet 24 serves an accumulation suppression structure that suppresses the material emitted from the upper end of the collector 16 from being accumulated on the insulator 18 in such a manner so as to shorten the insulation distance between the collector 16 and the collector housing 4.

The purge gas introduced into the collector housing 4 from the purge gas inlet 24 may be of any type as long as it does not affect the measurement. For example, the combustion assist gas fed into the collector housing 4 through the air introduction flow path 14 and the purge gas fed into the collector housing 4 through the purge gas inlet 24 may be supplied from a common source. The purge gas from the purge gas inlet 24 is not always required to be introduced, and therefore it may be configured such that the supplying of the purge gas to the purge gas inlet 24 can be switched on/off. In this way, the introduction of the purge gas from the purge gas inlet 24 can be stopped when no conductive material is discharged from the upper end of the collector 16, so that the purge gas consumption can be reduced.

Furthermore, the collector housing 4 is provided with an overhanging portion 26 provided so as to protrude inward from the inner peripheral surface. The overhanging portion 26 is provided to receive the material discharged from the upper end of the collector 16 and descending toward the insulator 18. Since the overhanging portion 26 is provided, the material emitted from the upper end of the collector 16 is suppressed from being accumulated on the insulator 18. That is, the overhanging portion 26 also serves as an accumulation suppression structure to suppress the accumulation of the conductive materials on the insulator 18.

Further, each of the lower insulator 18a and the upper insulator 18b has an outer diameter larger than the inner diameter of the main portion of the collector housing 4 surrounding the periphery of the collector 16. The lower part 4a and the upper part 4b of the collector housing 4 are in contact with the lower insulator 18a and the upper insulator 18b, respectively, at a position away from the collector 16 than the inner peripheral surface of the collector housing 4 surrounding the periphery of the collector 16.

Figure 2:
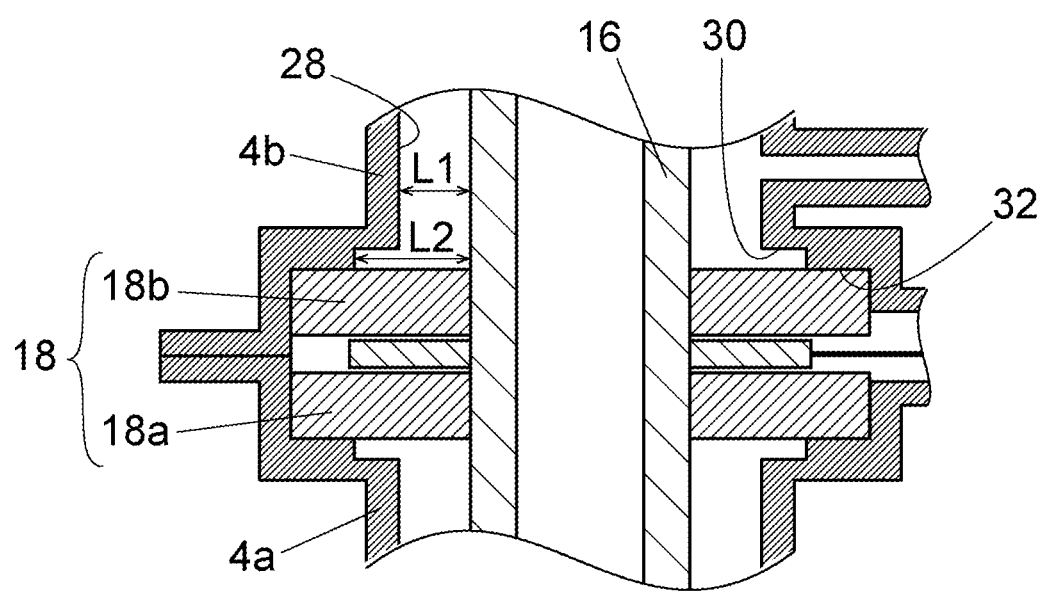
FIG. 2 is an enlarged view of an insulator holding portion of a collector housing in the FID of FIG. 1.

FIG. 2 is an enlarged view of a portion of the collector housing 4 holding the insulator 18. The upper part 4b of the collector housing 4 is provided with a first surface 30 and a second surface 32 each facing the upper surface of the upper insulator 18b. Both the first surface 30 and the second surface 32 are provided at positions away from the collector 16 than the inner peripheral surface 28 of the main portion of the collector housing 4. The second surface 32 is provided on the outer side of the first surface 30. The first surface 30 is spaced from the upper surface of the upper insulator 18b. The second surface 32 is in contact with the peripheral portion upper surface of the upper insulator 18b. The lower part 4a of the collector housing 4 is also in contact with the lower insulator 18a in the same manner as the upper part 4b.

With the above construction, the distance L2 from the contact point between the insulator 18 and the collector housing 4 to the collector 16 is longer than the distance L1 between the outer peripheral surface of the collector 16 and the inner peripheral surface 28 of the collector housing 4. Therefore, the collector 16 and the collector housing 4 are less electrically conductive. Furthermore, an area covered by the first surface 30 of the collector housing 4 is formed above the upper surface of the upper insulator 18b, and therefore, the conductive material will not be accumulated in this area. That is, providing the first surface 30 not only makes the insulation distance between the collector 16 and the collector housing 4 longer but also exerts an effect of preventing the conductive material from being accumulated on the upper surface of the upper insulator 18b in such a manner as to electrically conduct the collector 16 and the collector housing 4. That is, the first surface 30 of the collector housing 4 serves as an accumulation suppression structure of the conductive material onto the insulator 18.

In this example, as the accumulation suppression structure, three structures of the purge gas inlet 24, the overhanging portion 26, and the first surface 30 are provided, but the present invention is not limited thereto and does not require to include all three structures. Each of the purge gas inlet 24, the overhanging portion 26, and the first surface 30 has an effect of suppressing the decrease of the insulation between the collector 16 and the collector housing 4 due to the accumulation of the conductive material on the upper surface of the insulator 18. Therefore, any one of the structures may be used alone, or any two of the three structures may be used in combination. When two or more accumulation suppression structures are combined, it is obvious that the synergistic effect results in a higher reduction in the insulation between the collector 16 and the collector housing 4 than when one accumulation suppression structure is used alone.

Note that the example described above is merely an example of an embodiment of the hydrogen flame ionization detector according to the present invention. The embodiment of the hydrogen flame ionization detector according to the present invention is as follows.

In one embodiment of the hydrogen flame ionization detector according to the present invention, a nozzle, a cylindrical collector, an insulator, and a collector housing are provided. The nozzle ejects a sample gas upward. The tubular collector is provided above the nozzle with the longitudinal direction thereof vertically oriented and is configured to collect ions generated by the hydrogen flame formed at the tip of the nozzle. The insulator holds the collector on an inside thereof and is provided to extend radially outward of the collector. The collector housing accommodates the collector therein so as to surround the periphery of the outer peripheral surface of the collector while holding the peripheral portion of the insulator. Above the insulator, an accumulation suppression structure is provided. This accumulation suppression structure prevents the material emitted from the upper end of the collector from being accumulated on the insulator in such a manner as to shorten the insulation distance between the collector and the collector housing.

In the first aspect of the above-described one embodiment, the accumulation suppression structure is provided with a purge gas inlet provided at a position lower than the upper end of the collector and higher than the insulator and is configured to form an updraft above the insulator by the gas introduced from the purge gas inlet into the collector housing. According to this aspect, the material discharged from the upper end of the insulator is suppressed from falling toward the insulator, thereby suppressing the deterioration of the insulation between the collector and the collector housing.

In the second aspect of the embodiment, the accumulation suppression structure includes the overhanging portion provided to receive the material emitted from the upper end of the collector and falling toward the insulator. According to this aspect, the material emitted from the upper end of the collector is suppressed from falling toward the insulator, thereby suppressing the deterioration of the insulation between the collector and the collector housing. This second aspect can be combined with the first aspect described above.

In the second aspect of the above-described one embodiment, the overhanging portion may be provided so as to protrude further inward of the collector housing from the inner peripheral surface of the collector housing at the position above the upper end of the collector.

In the third aspect of the above-described one embodiment, the insulator has an outer diameter larger than the inner diameter of the main portion of the collector housing surrounding the outer peripheral surface of the collector. The collector housing is provided with the first surface and the second surface serving as the accumulation suppression structures. The first surface is spaced from the upper surface of the insulator with the first surface facing the upper surface of the insulator at the position away from the collector than the inner peripheral surface of the main portion of the collector housing. The second surface is in contact with the peripheral portion upper surface of the insulator at the position further away from the collector than the first surface. With this aspect, the area covered by the first surface is formed on the upper surface of the insulator, and therefore the conductive material will not be accumulated in this area. Thus, the collector and the collector housing are prevented from being electrically conducted by the conductive material accumulated on the upper surface of the insulator.

DESCRIPTION OF SYMBOLS

1: Hydrogen flame ionization detector (FID)
2: Housing body
4: Collector housing
4*a*: Upper part
4*b*: Lower part
6: Introduction pipe
8: Nozzle
10: Nozzle cap
12: Hydrogen gas introduction flow path
14: Air introduction flow path
16: Collector
18: Insulator
18*a*: Lower insulator
18*b*: Upper insulator
20: Terminal
22: Measurement circuit
24: Purge gas inlet
26: Overhanging portion
28: Inner peripheral surface of collector housing
30: First surface
32: Second surface

The invention claimed is:

1. A hydrogen flame ionization detector comprising:
   a nozzle configured to eject a sample gas upward;
   a cylindrical collector provided above the nozzle with a longitudinal direction thereof vertically oriented, the collector being configured to collect ions generated by a hydrogen flame formed at a tip of the nozzle;
   an insulator configured to hold the collector on an inside of the insulator, the insulator being configured to extend in a radially outward direction of the collector; and
   a collector housing configured to accommodate the collector therein to surround an outer peripheral surface of the collector while holding a peripheral portion of the insulator,
   wherein an accumulation suppression structure is provided above the insulator to suppress a material emitted from an upper end of the collector from being accumulated to shorten an insulation distance between the collector and the collector housing.

2. The hydrogen flame ionization detector as recited in claim 1,
   wherein the accumulation suppression structure includes a purge gas inlet provided at a position lower than the upper end of the collector and higher than the insulator, the accumulation suppression structure being configured to form an updraft toward above the insulator by a gas introduced from the purge gas inlet into the collector housing.

3. The hydrogen flame ionization detector as recited in claim 1, wherein the accumulation suppression structure includes an overhanging portion provided to receive a material discharged from the upper end of the collector and falling toward the insulator.

4. The hydrogen flame ionization detector as recited in claim 3,
wherein the overhanging portion is provided to protrude from an inner peripheral surface of the collector housing inward of the collector housing at a position above the upper end of the collector.

5. The hydrogen flame ionization detector as recited in claim 1,
wherein the insulator has an outer diameter larger than an inner diameter of a main portion of the collector housing surrounding the outer peripheral surface of the collector, and
wherein the collector housing is provided with a first surface serving as the accumulation prevention structure, the first surface being arranged to face an upper surface of the insulator with a distance from the upper surface at a position away from an inner peripheral surface of the main portion of the collector housing, and a second surface in contact with an upper surface of the peripheral portion of the insulator at a position away from the collector radially outward than the first surface.

* * * * *